Nov. 17, 1931.  A. C. EICHENLAUB ET AL  1,832,192
METHOD OF MAKING PORTLAND CEMENT
Filed Jan. 7, 1927
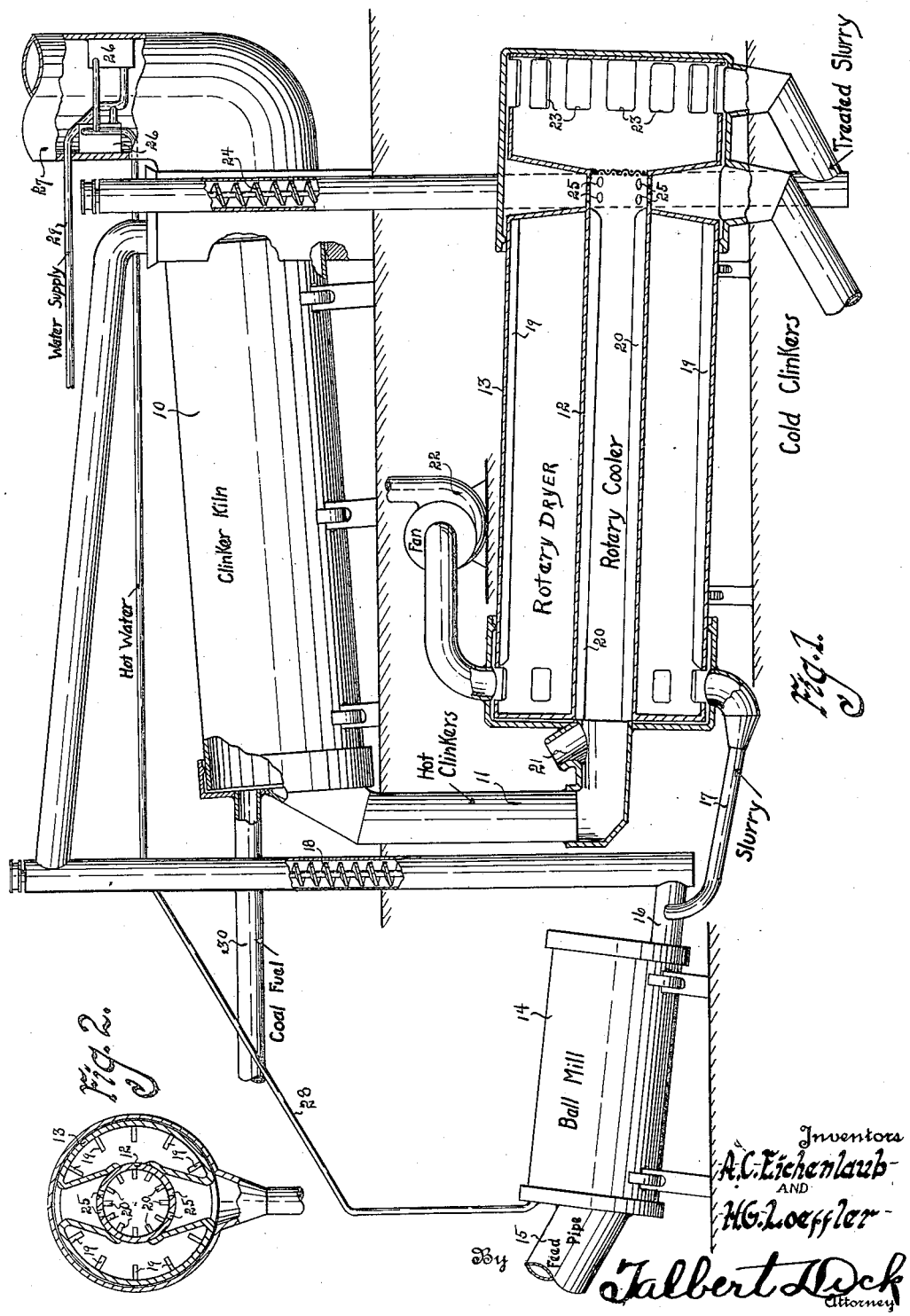

Patented Nov. 17, 1931

1,832,192

UNITED STATES PATENT OFFICE

ADELBERT C. EICHENLAUB AND HERMAN G. LOEFFLER, OF DES MOINES, IOWA, ASSIGNORS OF ONE-THIRD TO CONRAD C. MILLER, OF DES MOINES, IOWA

METHOD OF MAKING PORTLAND CEMENT

Application filed January 7, 1927. Serial No. 156,044.

The principal object of our invention is to dry the slurry and cool the clinker by means of each other in a single operation.

More specifically the object of our invention is to dry the Portland cement slurry and cool the Portland cement clinker by passing the hot clinker through a cooler mounted inside a rotary dryer through which the slurry is slowly passing.

A further object is to simplify the machinery for making Portland cement and also increase production.

A further object is to reduce the amount of fuel now being used to manufacture Portland cement.

A still further object is to increase the temperature in the stack and the placing of water tanks in said stack for supplying hot water to the ball mills.

A still further object is to draw air through the rotary cooler and then through the rotary dryer.

These and other objects will be apparent to those skilled in the art.

Our invention consists in the method hereinafter set forth, pointed out in our claims and illustrated in the accompanying drawings, in which:

Fig. 1 is a diagrammatical side view of the machinery used in our improved method of making Portland cement.

Fig. 2 is a cross sectional view of the rotary cooler and dryer and is taken on line 2—2 of Fig. 1.

Two of the big problems that confront manufacturers of Portland cement are the drying of the slurry and the cooling of the clinkers. Slurry consists of an intimate mixture of argillaceous and calcareous materials containing ordinarily from thirty to thirty-five percent of water. This water is picked up when the materials are mixed with water for grinding to the desired fineness, or as in the dry process, the grinding of the materials in a dry state to the desired fineness, and subsequently mixing with water. This wet mixture must be dried and placed in a kiln to produce the clinker. The clinker is therefore the material produced by the calcination to incipient fusion of the slurry and leaves the kiln at a temperature of about 2,100 degrees Fahrenheit. Many methods are used for cooling the clinker, such as leaving the same in an open field to cool off naturally, immersing in water, subjecting to air currents in rotary cooling shells, and the like, but in each of these methods, the cooling involves a total loss of heat units. The drying of the slurry demands a great amount of fuel. It has been tried to draw the heated products of combustion from the stack over the slurry but this contaminates the same due to the presence of furnace gases.

We have overcome these disadvantages by utilizing the heat in the clinker to dry the slurry.

We have used the numeral 10 to designate the kiln. It is a long steel plate cylinder capable of slow rotation with the delivery end set slightly lower than the feed end, so that the material will slowly pass to the delivery end. If the slurry is placed in the feed end of the kiln in wet condition it commences at once to dry in that end of the kiln to a semi-dry substance, thereby shrinking in volume. From this zone the semi-dry material passes toward the lower end of the kiln and reaches the burning zone where the temperature of the kiln and materials is raised to the point of incipient fusion and clinker results. From the delivery end of the kiln the hot clinker passes through a spout 11 into the delivery end of our cylindrical cooling shell 12. This cylindrical shell is mounted concentrically inside the rotary drying shell 13 capable of slow rotation. It is in this last mentioned shell that part of the slurry is dried. We have used the numeral 14 to designate a ball mill having the feed pipe 15. From this mill the wet slurry passes into the outlet pipe 16. From tests we find that the clinker only possesses enough British thermal units to reduce the water in the slurry one-half, or leaving about seventeen percent in the slurry. We therefore find that it is easier to handle the slurry, by only passing a part of the same through the drying cylinder, which is capable of completely drying a part of the slurry, and passing the other part of the wet slurry direct to the kiln. Therefore in the drawings we show part of the slurry passing through the pipe 17 into the dryer 13 and the other part going directly to the kiln by an elevator or other suitable means. In the drawings we merely show it in the form of an auger conveyor 18. The delivery end of the cooler and dryer, the same as the kiln, is at a lower altitude than the feed end, and for this reason the clinker and slurry slowly work toward the delivery end.

Lifting plates 19, fastened to the inside of the outer shell 13, run parallel to the axis of the dryer for its entire length. The revolving of the dryer causes these plates to lift and drop the material being dried onto the hot inner shell 12. It will be found that less power is necessary to rotate this type of dryer than the single shell dryer due to the fact that a large portion of the slurrry lies on top of the inner shell and is carried over the center before being again dropped to the outer shell; the center of gravity of the slurry being not far from the axis of rotation. The lifting plates 20 in the inner shell tend to hold the clinker close to the inside of the shell. We have provided an air inlet port 21 so that air may pass through same into the shell 12 and through the cascading clinkers being cooled. From the end of the shell 12 which terminates inside the outer shell 13, the air which has absorbed much heat from the clinker passes back in the annular space between the two cylinders, coming into intimate contact with the showering material to be dried. This course taken by the air is provoked by an induced draft fan 22. By this arrangement and the feeding of the slurry at the head end of the shell 13, the wet material comes in contact first with the greatest heat and still has the counter-current principle of the hot air traveling against the material being dried. Any suitable means may be used to rotate the kiln and cooler and dryer shells. The dry slurry will pass through holes 23 in the end of the shell 13 and may be conveyed to the kiln in any suitable manner. In the drawings we merely show an auger conveyor 24. The cold clinkers pass through the holes 25 in the end of the shell 12 and to a mill, not shown. By much of the slurry entering the kiln in dried condition, the kiln does not have to be near as long as the ones now in use. The slurry is more readily in condition for the burning zone and because of this condition is also more rapidly converted into clinker, thus increasing the production of the plant.

It will readily be seen by those skilled in the art, that the fuel cost will be reduced enormously, while the stack temperature will be greatly increased.

If it is desired boilers or tanks 26 may be placed in the stack 27. By using hot water in the ball mill from these tanks, it will be found that the slurry will enter the drying shell and the kiln in very hot condition. This will greatly aid the drying of the same and thereby decrease fuel cost. We have designated the pipe leading from these tanks to the ball mill by the numeral 28. The numeral 29 designates a pipe leading from a supply tank not shown. The numeral 30 designates a fuel pipe leading into the kiln.

In order to hold more slurry adjacent the rotary cooler, lifting plates may be secured to the outside of the cooler. Any desirable method for operatively connecting the ball mill, clinker kiln, rotary dryer, fan 22, and rotary augers 18 and 24 to a prime mover may be employed.

In actual practice we recommend the pipe 16 leading to a storage tank and a separate pipe leading from the storage tank to the pipes 17 and 18 so that the slurry may be obtained as desired.

It will readily be understood by those skilled in the art that we have utilized every possible heat unit and thereby increased the thermal efficiency and decreased the fuel cost.

We claim as our invention:

1. The method of making Portland cement which comprises subjecting dried slurry to such a temperature inside a kiln as to produce cement clinker, passing the heated clinker through an enclosed passageway, passing the raw cement slurry before it reaches the kiln through a passageway surrounding the enclosed passageway through which the hot clinker passes whereby the clinker is cooled and the raw cement slurry is dried, and finally passing the dried slurry to the kiln.

2. The method of making Portland cement which comprises subjecting dried slurry to such a temperature inside the kiln as to produce cement clinker, passing the heated clinker through an enclosed rotating passageway, passing the raw cement slurry before it enters the kiln through an enclosed rotating passageway concentric with and surrounding the passageway through which the heated clinker passes whereby the slurry is dried by indirect contact with the clinker and passing said dried slurry into the kiln.

3. The method of making Portland cement which consists in subjecting dried slurry to such a temperature inside the kiln as to produce cement clinker, passing the heated clinker through an enclosed passageway, passing the raw cement slurry through a passageway surrounding the passageway through which the hot clinker passes, passing air first through the passageway through which the hot clinker passes and then through the passageway through which the slurry passes whereby cooling the clinker and drying the slurry and finally passing the dried slurry into the kiln.

ADELBERT C. EICHENLAUB.
HERMAN G. LOEFFLER.